Feb. 23, 1926.
C. A. BAKER
1,574,181
LUBRICATION PUMP
Filed Oct. 13, 1924
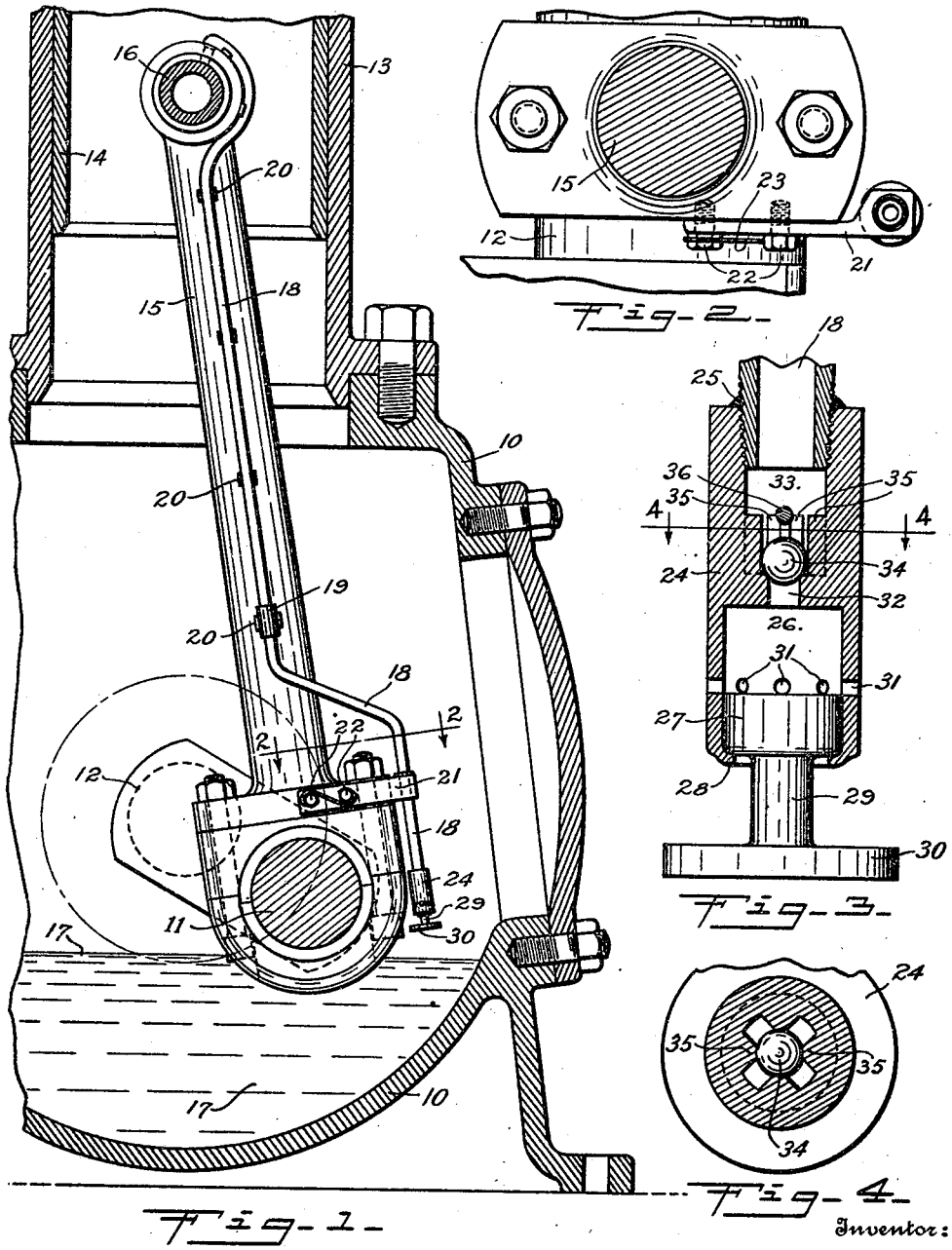
Inventor:
C. A. BAKER.

Patented Feb. 23, 1926.

1,574,181

UNITED STATES PATENT OFFICE.

CHESTER A. BAKER, OF OMAHA, NEBRASKA.

LUBRICATION PUMP.

Application filed October 13, 1924. Serial No. 743,371.

*To all whom it may concern:*

Be it known that I, CHESTER A. BAKER, a citizen of the United States, residing at Omaha, in the county of Douglas and State of Nebraska, have invented certain new and useful Improvements in Lubrication Pumps, of which the following is a specification.

My invention relates to lubricating means for the piston-pins, pistons, crossheads, or other reciprocating parts of engines, pumps, elastic-fluid compressors and the like, in which, through the medium of a connecting-rod, such reciprocating parts actuate or are actuated by a crank arranged to dip into an oil-reservoir during a portion of its revolution. It is the object of my invention to provide a simple, inexpensive and efficient device by which oil from the reservoir may be supplied, automatically and under definite pressure, to reciprocating parts of the class mentioned.

In the accompanying drawings Fig. 1 is a vertical sectional view of a portion of an elastic-fluid compressor, having upon the connecting-rod thereof a lubrication pump embodying my invention, Fig. 2 is a detail section on the line 2—2 of Fig. 1, Fig. 3 is a detail vertical section of the pump alone, and Fig. 4 is a section on the line 4—4 of Fig. 3.

Referring to Fig. 1, there are indicated portions of a crank-case 10, crank 11, crank-shaft 12, cylinder 13 and piston 14, and a connecting-rod 15 extending from the crank 11 to the piston-pin 16, all comprising a well-known operative assemblage of parts employed in engines, compressors, and the like. The lower portion of the crank-case forms a reservoir for containing a quantity of oil 17, into which the crank 11 and the lower portion of the connecting-rod dip at each revolution of the crank; and in many instances the lubrication of the moving parts is effected solely by the splashing of the oil caused by the dipping of the crank therein.

My lubrication pump is designed for use in connection with mechanism of the general character above set forth, and is mounted upon the connecting-rod so as to move bodily therewith. In the illustrated structure, the pump supplies oil to the piston-pin 16, the oil being delivered through a tube 18 which extends to the upper end or head of the connecting-rod, the intermediate portions of the tube being secured to the side of the connecting-rod, and the pump proper being carried at the lower end of the delivery-tube, alongside the box or crank-bearing at the lower end of the rod. The tube 18 is in two sections which are connected by a coupling 19, the latter and the upper section of the tube being secured to the side of the rod by a series of spot-welds 20. The lower section of the tube is offset to extend past the lower head of the rod, and is connected with the latter by a small arm or bracket 21 which is attached to the side of the head by screws 22, the heads of said screws being connected to each other by a lock-wire 23 to prevent accidental loosening thereof. The pump-body 24 is cylindrical, and the upper end thereof is bored and threaded to screw onto the lower end of the delivery-tube 18, said tube and the body 24 preferably being also welded or soldered together, as shown at 25 in Fig. 3, to prevent loosening of the threaded connection. The lower portion of the body 24 is bored to form the cylinder-space 26, in which the piston 27 is slidably disposed. The lower end of the body is reduced to a thin lip or flange 28 which is bent or swaged inwardly beneath the piston, and prevents removal of the latter from the cylinder. A stem 29 is formed integrally with the piston, said stem extending through the opening between the inner edges of the flange 28, and at the lower end of the stem is a disk or plate 30 which is preferably integral with the stem and piston. In the sides of the pump-cylinder are a plurality of radially extending supply-ports 31 which communicate with the cylinder-space 26 just above the upper end of the piston 27 when the latter is in the lower position at which it rests upon the flange 28 as shown in Fig. 3. From the upper end of the cylinder-space 26 a discharge-passage 32 extends up to communicate with the chamber 33 in the upper portion of the body 24, said passage being controlled by a ball-valve 34 which is arranged to open upwardly. At the sides of the lower portion of the chamber 33 are guide-ribs 35 which keep the ball 34 centered with the seat at the upper end of the passage 32. At the upper ends of the guide-ribs a pin 36 is extended transversely through the pump-body to limit the lift of the valve-ball 34.

The operation of the described device will be readily apparent. During the downward stroke of the crank, connecting-rod and piston, the plate 30 strikes the oil 17 in the lower portion of the crank-case, causing the piston 27 to move upwardly in the cylinder-space 26, thereby first closing the ports 31 and then forcing the contents of the cylinder-space through the passage 32 and past the valve 34. At the beginning of the upward stroke of the connecting-rod, the drag of the oil 17 upon the plate 30, together with the inertia of said plate, and of the stem and piston, causes the piston to move to the lower position at which it rests upon the flange 28, and thus opens the ports 31. As the downward movement of the piston causes a partial vacuum in the cylinder-space, a quantity of oil from the outside of the pump-body is drawn into the cylinder as the ports are opened, and is thus ready to be forced past the ball-valve and into the delivery-tube at the next upward movement of the pump-piston. The pump will thus deliver a small quantity of oil to the tube 18 at each revolution of the crank-shaft, the oil being under a definite and positive pressure, sufficient to elevate the fluid to the piston-pin or other part to which the delivery-tube is connected. The pressure effective for elevating the oil may be regulated to some extent by varying the proportionate areas of the pump-piston and fluid-engaging plate 30. In actual practice, a device proportioned as shown in the drawing, applied to a large ammonia compressor, was found to be capable of delivering oil under a pressure of two pounds per square inch, at a height of five feet above the level of the oil in the crank-case.

I am aware that it is a common practice to provide a valved oil-tube extending from the lower portion of a connecting-rod to the upper portion thereof, the lower end of the tube carrying a scoop or dipper for directing oil from the crank-case into the valved tube, and in some cases the impact-pressure of the oil thus delivered to the tube is sufficient to effect the desired elevation of the oil and lubrication of parts at the upper end of the rod. Such scoop or dipper devices are incapable, however, of operating efficiently in large low-speed machines, and in such cases it is essential that the oil be supplied under definite and positive pressure, such as is effected by the use of my pump.

Now, having described my invention, what I claim and desire to secure by Letters Patent is:

1. The combination with a crank and connecting-rod arranged to dip into an oil reservoir, of a pump-body mounted fixedly upon the connecting-rod, a piston reciprocable in said pump-body, and a plate connected with said piston and arranged externally of the pump-body to engage the oil in the reservoir and be thereby actuated to drive the piston.

2. In a device of the class described, a pump-body having a cylinder-space and a valved delivery-passage communicating therewith, a piston reciprocable in said cylinder-space, and a plate disposed externally of the pump-body and connected with the piston, said plate being of greater transverse area than the piston and adapted to actuate the piston as the pump-body is moved reciprocatingly through a lubricant fluid.

3. The combination with a connecting-rod, of a pump-cylinder fixedly connected with said rod, a piston reciprocable in said pump-cylinder, said cylinder having a valved discharge-passage and having supply ports extending through the sides thereof and disposed to be opened and closed by the piston as it moves respectively to and from one limit of its travel, a stem carried by the piston and extending from the cylinder, and a plate carried by said stem, said plate being arranged in a plane transverse to the axis of the piston and cylinder and being of an area in said plane greater than that of the piston.

4. In a device of the class described, a pump-body bored at one end to form a cylinder-space and at the opposite end to form a valve-chamber, there being a passage connecting said cylinder-space and valve-chamber, a valve controlling said passage and openable toward said chamber, a piston slidably disposed in said cylinder-space, an integral flange turned in at the open end of the cylinder to retain the piston therein, a stem connected with the piston and extending through the open end of the cylinder, a plate carried at the outer end of said stem, a tube connected with the pump-body to communicate with said valve-chamber, there being inlet ports through the sides of the cylinder arranged to be controlled by movements of the piston, and means for mounting said pump-body in fixed relation to a connecting-rod whereby to dip therewith into an oil reservoir.

CHESTER A. BAKER.